United States Patent
Matsukawa

(10) Patent No.: US 11,061,587 B2
(45) Date of Patent: Jul. 13, 2021

(54) MEMORY SYSTEM SWITCHING BETWEEN A LOCKED AND UNLOCKED STATE AND MEMORY CONTROL METHOD

(71) Applicant: Toshiba Memory Corporation, Minato-ku (JP)

(72) Inventor: Shinichi Matsukawa, Shinagawa (JP)

(73) Assignee: Toshiba Memory Corporation, Minato-ku (JP)

( * ) Notice: Subject to any disclaimer, the term of this patent is extended or adjusted under 35 U.S.C. 154(b) by 28 days.

(21) Appl. No.: 16/565,641

(22) Filed: Sep. 10, 2019

(65) Prior Publication Data

US 2020/0293207 A1   Sep. 17, 2020

(30) Foreign Application Priority Data

Mar. 13, 2019  (JP) .............................. JP2019-045445

(51) Int. Cl.
  *G06F 3/06*   (2006.01)
(52) U.S. Cl.
  CPC .......... *G06F 3/0622* (2013.01); *G06F 3/0659* (2013.01); *G06F 3/0673* (2013.01)
(58) Field of Classification Search
  CPC .... G06F 3/0622; G06F 3/0659; G06F 3/0673; G06F 21/31; G06F 12/14–145
  See application file for complete search history.

(56) References Cited

U.S. PATENT DOCUMENTS

| | | | |
|---|---|---|---|
| 7,895,406 B2 | 2/2011 | Nagao | |
| 8,583,835 B1 * | 11/2013 | Kan | G06F 3/0607 710/5 |
| 2004/0236918 A1 | 11/2004 | Okaue et al. | |
| 2006/0090053 A1 * | 4/2006 | Boning | G06F 12/1441 711/163 |
| 2008/0244734 A1 | 10/2008 | Okaue | |
| 2014/0181433 A1 * | 6/2014 | Pfeffer | G06F 3/0659 711/160 |
| 2014/0281226 A1 | 9/2014 | Kato et al. | |

FOREIGN PATENT DOCUMENTS

| | | |
|---|---|---|
| JP | 2004-030102 A | 1/2004 |
| JP | 4867760 B2 | 2/2012 |

* cited by examiner

*Primary Examiner* — Charles Rones
*Assistant Examiner* — Hewy H Li
(74) *Attorney, Agent, or Firm* — Oblon, McClelland, Maier & Neustadt, L.L.P.

(57) ABSTRACT

According to one embodiment, the memory system includes a memory and a memory controller. After the memory controller determines that a plurality of first commands including addresses have been received from a host device in a first sequence, when a plurality of second commands including addresses are received from the host device in a second sequence, the memory controller stores the addresses included in the plurality of the second commands in a memory; converts the address stored in the memory into a first password; and restricts or does not restrict execution of the first command and the second command from the host device after the memory system is started up, and removes the restriction of the execution or restricts the execution of the first command and the second command from the host device after the first password is matched with a predetermined second password.

12 Claims, 10 Drawing Sheets

MEMORY SYSTEM SWITCHING BETWEEN A LOCKED AND UNLOCKED STATE AND MEMORY CONTROL METHOD

CROSS REFERENCE TO RELATED APPLICATIONS

This application is based upon and claims the benefit of priority from prior Japanese Patent Application No. P2019-045445 filed on Mar. 13, 2019, the entire contents of which are incorporated herein by reference.

FIELD

Embodiments described herein relate generally to a memory system and a memory control method.

BACKGROUND

A host device and a memory system, e.g. a memory card, transmit/receive a command and data by means of communication. There has been known a memory system having a function for switching between a locking state and an unlocking state. The locking state is a state in which reading of data from a memory of the memory system or writing of data to the memory is disallowed, in response to a command from the host device. The unlocking state is a state in which writing to the memory that cannot be written is allowed or reading from the memory that cannot be read is allowed, in response to the command from the host device.

DETAILED DESCRIPTION

Certain embodiments provide a memory system and a memory control method, each capable of unlocking a memory.

According to one embodiment, the memory system includes a memory and a memory controller configured to control the memory. The memory controller determines whether or not a plurality of first commands including addresses from a host device have been received in a first sequence. Moreover, after the memory controller determines that the plurality of the first commands have been received in the first sequence, when a plurality of second commands including addresses from the host device are received in a second sequence, the memory controller stores the addresses included in the plurality of the second commands in the memory. Moreover, the memory controller converts into a first password the addresses included in the plurality of the second commands stored in the memory. Moreover, the memory controller restricts or does not restrict execution of the first command and the second command from the host device by the memory controller after the memory system is started up, and removes the restriction of the execution or restricts the execution of the first command and the second command from the host device by the memory controller after the first password is matched with a predetermined second password.

EMBODIMENTS

Hereinafter, a memory system according to the embodiments will now be explained in details, with reference to the drawings. The drawings referred to are merely schematic. In the following explanation, the common reference signs are attached to constituents having substantially the same functions and configurations.

First Embodiment (Configuration of Memory System)

Figure 1:
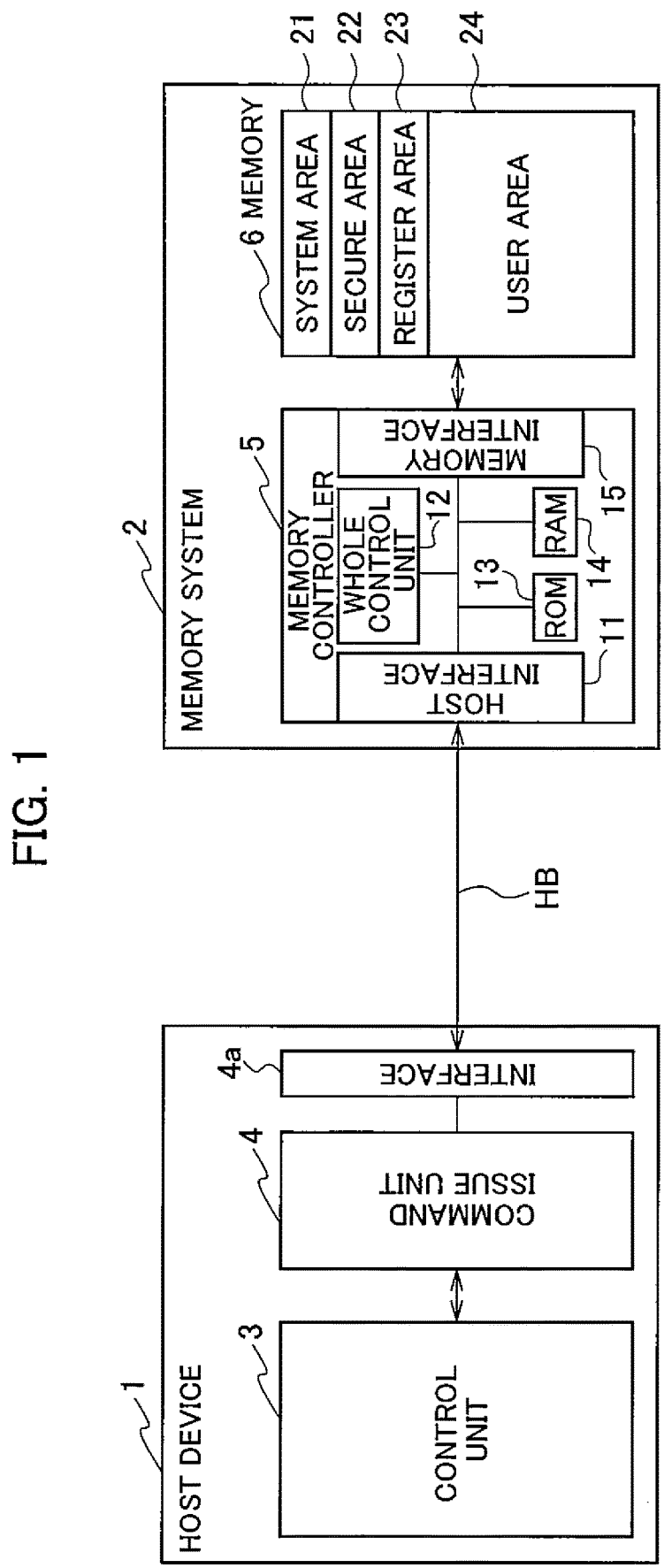
FIG. 1 is a block diagram showing a configuration of a memory system according to a first embodiment and a host device.

FIG. 1 is a block diagram showing a configuration of a memory system according to a first embodiment and a host device. The host device 1 is connected to the memory system 2. The host device 1 and the memory system 2 transmit/receive a command and data from/to each other by means of communication.

As shown in FIG. 1, the host device 1 includes a control unit 3, a command issue unit 4, and an interface 4a, and is connected to the memory system 2 through the interface 4a. The command issue unit 4 issues a command to the memory system 2. The control unit 3 controls the command issue unit 4. Moreover, the host device 1 includes hardware and software for accessing the memory system 2. A user instructs the software to execute an operation of writing of data to the memory system 2 and reading of data from the memory system 2.

When the memory system 2 is connected to the host device 1 which is in a power-on state, or when the host device 1 is turned on while the memory system 2 is inserted in the host device 1 which is in a power-off state, the memory system 2 executes a process according to an access from the host device 1, after executing an initialization operation in response to a power supply from the host device 1. The memory system 2 includes a memory controller 5 and a memory 6. The memory system 2 is a Secure Digital (SD) memory card, Solid State Drives (SSD), or the like, for example.

(Configuration of Memory)

The memory 6 is a NAND-type flash memory data that stores data in a nonvolatile manner.

A storage area of the memory 6 is divided into a plurality of areas according to the types of data to be held. The plurality of areas include a system area 21, secure area 22, register area 23 and user area 24, as shown in FIG. 1.

The system area 21 is an area provided for the memory controller 5 to store data required for the operation thereof, and mainly stores information, including management information, security information, media identification (ID), and the like, with regard to the memory system 2. The secure area 22 stores important data and secure data.

The register area 23 is a register specified in accordance with a specification of the SD memory card. The register area 23 stores manufacturing information of the memory system 2, and operation information for operating the memory system 2.

The user area 24 can be freely accessed and used by the host device 1, and stores user data and image data. In the following explanation, it is supposed that the memory 6 uses the user area 24.

Figure 2:
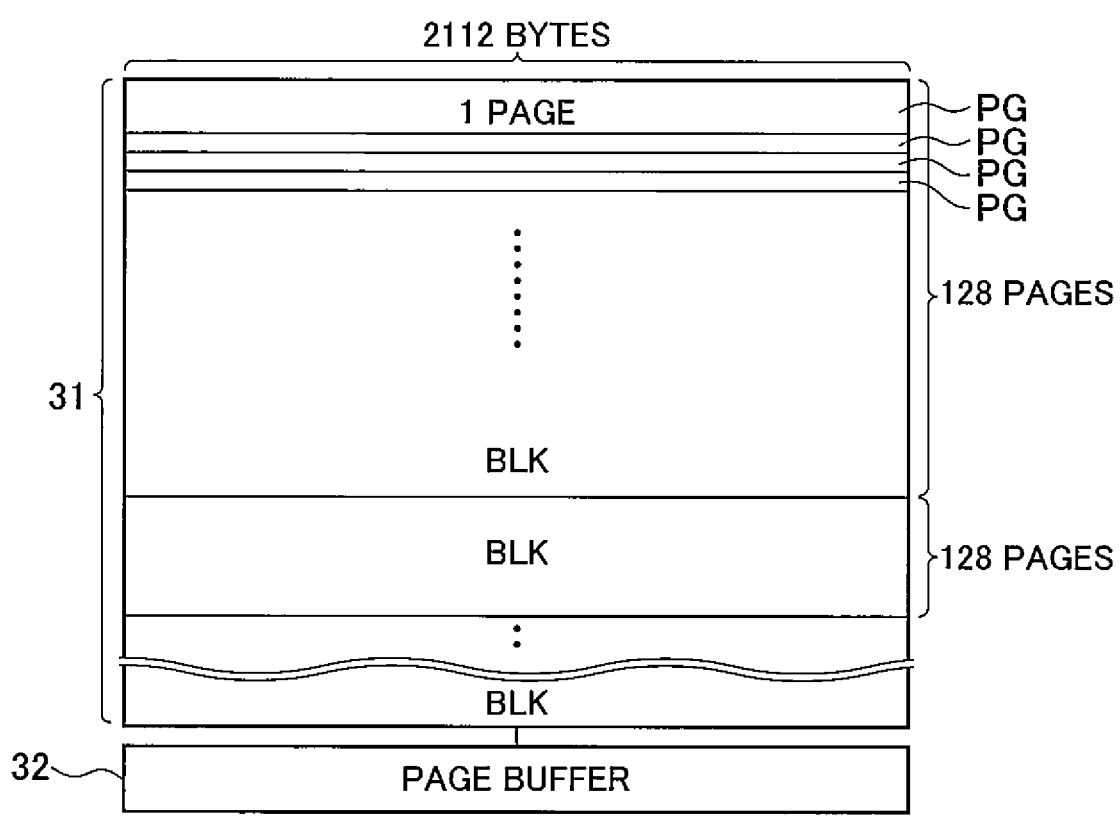
FIG. 2 is a diagram showing a configuration of memory space of a memory in the memory system according to the first embodiment.

FIG. 2 is a diagram showing a configuration of memory space of the memory 6 in the memory system 2 according to the first embodiment. The memory 6 includes a memory area 31 and a page buffer 32. The user area 24 of the memory 6 shown in FIG. 1 includes the memory area 31 and the page buffer 32.

The memory area 31 includes a plurality of blocks BLK. Each block BLK is configured by a plurality of pages PG. Each page PG includes a plurality of cell transistors serially connected to one another.

Each cell transistor is configured by a metal oxide semiconductor field effect transistor (MOSFET) having a stacked gate structure. The MOSFET having the stacked gate structure includes a tunnel insulating film, floating gate electrode, electrode-electrode insulating film, control gate electrode and source/drain diffusion layers. The threshold voltage of each cell transistor varies in accordance with the number of electrons stored in the floating gate electrode and the cell transistor stores information corresponding to a difference in the threshold voltage.

The control gate electrodes of the cell transistors belonging to the same row are connected to the same word line. Selection gate transistors are provided on both ends of the cell transistors belonging to the same column and serially connected. One of the selection gate transistors is connected to a bit line. A set of the cell transistors which share the word line is treated as a 1 page PG, and the data writing and data reading operations are executed for every page. The writing of the data to the memory 6, the reading of data from the memory 6, and the like are controlled by the memory controller 5.

(Configuration of Controller)

Refer to FIG. 1 again. The memory controller 5 includes a host interface 11, a whole control unit 12, a Read Only Memory (ROM) 13, a Random Access Memory (RAM) 14, and a memory interface 15.

The memory controller 5 includes a processor, such as a central processing unit (CPU), as hardware, for example; and firmware (program) stored in the ROM 13 and loaded on the RAM 14 is executed by the processor, and thereby the memory controller 5 executes a part of or all of functions of the host interface 11, the whole control unit 12, the RAM 14, and the memory interface 15. The host interface 11, the whole control unit 12, and the memory interface 15 are interconnected by means of a bus.

The host interface 11 is connected to the host device 1 through a host bus HB, and manages communication with the host device 1. For example, the host interface 11 transfers an instruction and data which are received from the host device 1 to the whole control unit 12 and the RAM 14, respectively.

The RAM 14 has a function as a buffer for temporarily storing data received from the memory 6 and the host device 1. The ROM 13 stores a control program and the like to be controlled by the whole control unit 12. In addition, in the memory system according to the embodiments, the described action of being stored on the memory 6 may be an action of being stored in the RAM 14 instead of the memory 6. For example, a read command address to be transmitted to the password conversion process may be stored in the memory 6, and a read command address to be transmitted to the password verification process may be stored in the RAM 14 instead of the memory 6.

The memory interface 15 is connected to the memory 6, and manages communication with the memory 6. The memory interface 15 transmits/receives a signal in accordance with the NAND interface. The signal in accordance with the NAND interface includes various control signals and input/output signals, for example. The input/output signals include a command, programing data, read data, an address signal, and various management data.

The whole control unit 12 manages control of whole of the memory system 2. The whole control unit 12 is realized by a part of functions of the processor and the RAM 14, for example. The whole control unit 12 manages a storage state of the memory 6, controlling the RAM 14 and the memory interface 15 during writing and reading.

The memory controller 5 returns a response to a command to the host device 1 in response to the command sent from the host device 1. The memory controller 5 commands reading of data, writing of data, erasing of data, and the like to the memory 6 in response to the command sent from the host device 1. The memory controller 5 writes data to which writing is instructed from the host device 1 in the memory 6, and reads data to which reading is instructed from the host device 1 from the memory 6, to be transmitted to the host device 1.

The memory controller 5 manages a data storage state by the memory 6. The managing of the data storage state means managing a relationship of which physical address page (or physical block) holds data of which logical address, and which physical address page (or physical block) is in an erased state (state where no data is written or invalid data is held therein). The memory controller 5 manages the storage state using an address conversion table for storing a correspondence relationship between the logical address and the physical address.

The memory controller 5 acquires a physical address associated with a certain logical address, and reads data from a storage area of the acquired physical address. Management of the storage state of the memory 6 includes management of the storage area, wear leveling, garbage collection, and refresh, of the memory 6.

(Start-Up Sequence of Memory System)

Figure 3:
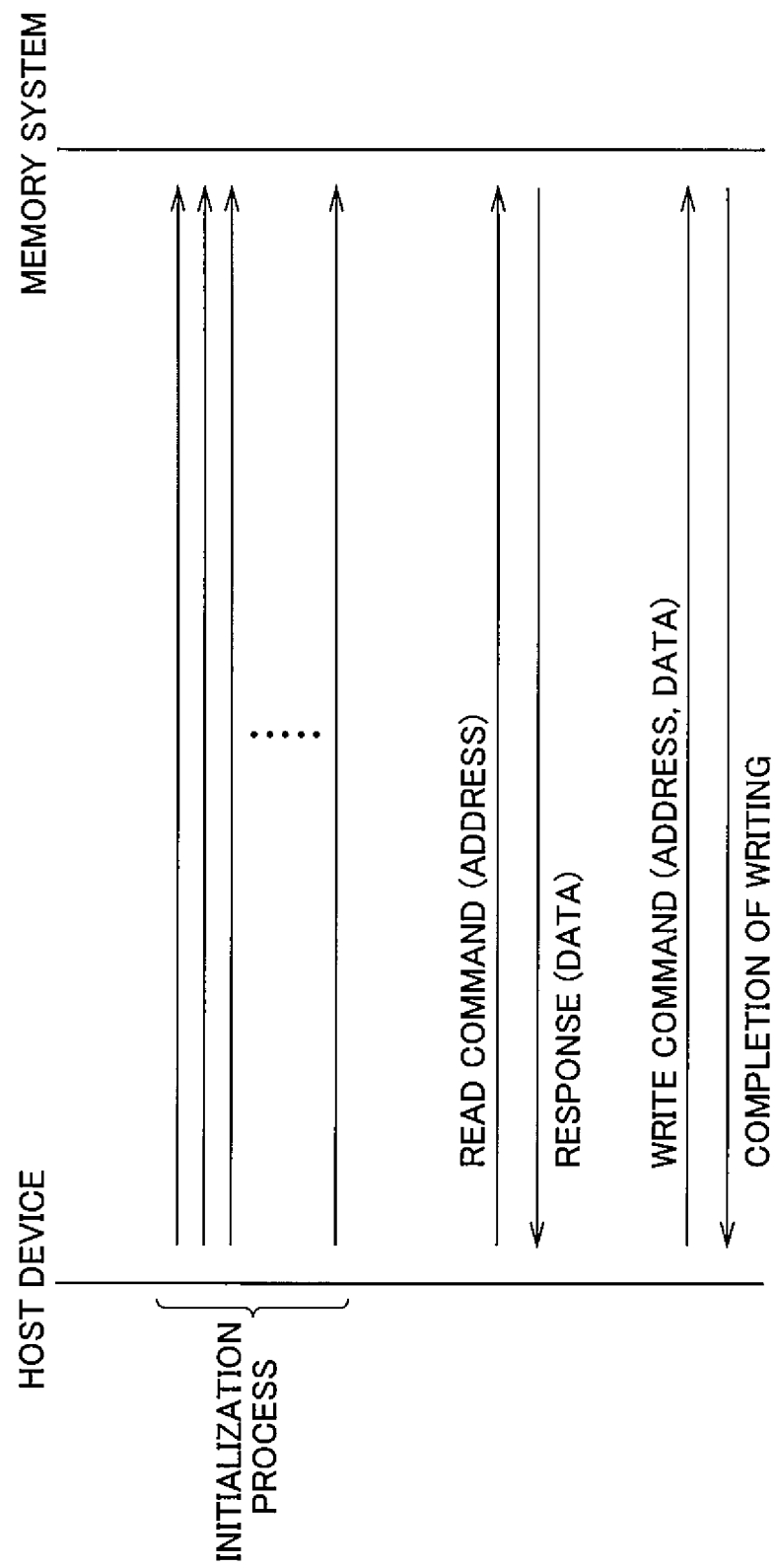
FIG. 3 is a diagram showing a start-up sequence of the memory system according to the first embodiment.

Next, with reference to a start-up sequence shown in FIG. 3, there will now be explained a procedure of starting up the memory system 2 froth the host device 1 to read/write data, in the memory system according to the first embodiment.

Firstly, the initialization process for starting up the memory system 2 is executed. After the initialization process is completed, the host device 1 issues a read command including a read address. In the memory system 2, when the read command is received from the host device 1, the memory controller 5 reads data on the basis of the read address of the memory 6, and returns the read data to the host device 1.

Next, the host device 1 issues a write command including a write address and data to be written. When the memory system 2 receives the write command sent from the host device 1, the memory controller 5 writes the data at the write address of the memory 6.

(Lock/Unlock Mode)

The memory system 2 operates in a lock mode or an unlock mode. The lock mode (access restriction) used herein means disallowing a transmission of data read from the memory 6 to the host device 1. The unlock mode used herein means allowing the transmission of the data read from the memory 6 to the host device 1. Here, there will now be explained a case where the operation mode of the memory system 2 is the lock mode when starting up the memory system 2. Note that it may be shifted to the lock mode in accordance with a lock command received from the host device 1. In the memory system according to the first embodiment, the memory is unlocked without using a dedicated unlock command used only for the unlocking.

(Unlocking Process)

Figure 4:
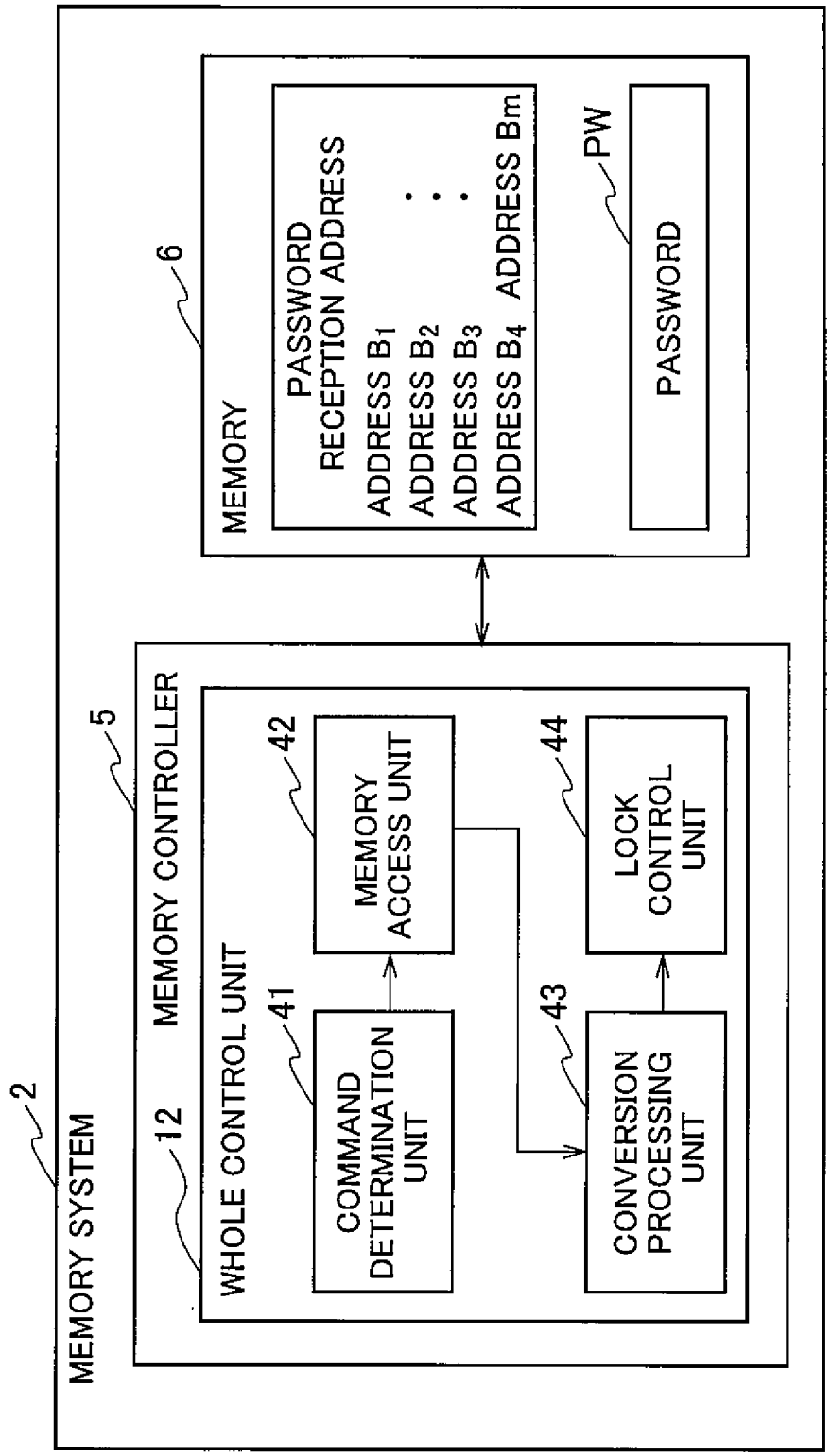
FIG. 4 is a block diagram showing a configuration of the memory system according to the first embodiment.

Next, there will now be explained an unlocking process of the memory system according to the first embodiment. FIG. 4 is a block diagram showing a configuration of the memory system 2 according to the first embodiment. The whole control unit 12 includes a command determination unit 41, a memory access unit 42, a conversion processing unit 43, and a lock control unit 44. The whole control unit 12 executes a command cancel processing program stored in the ROM 13, and thereby functions of the command determination unit 41, the memory access unit 42, the conversion processing unit 43, and the lock control unit 44 can be realized.

The command determination unit 41 determines whether or not a plurality of first read commands including addresses $A_1$ to $A_n$ (where n is a natural number) have been received from the host device 1 in a first sequence.

After the command determination unit 41 determines that the plurality of first read commands including the addresses $A_1$ to $A_n$ have been received from the host device 1 in the first sequence, the memory access unit 42 accesses the memory 6 when a plurality of second read commands including addresses $B_1$ to $B_m$ (where m is a natural number) are received in the second sequence, and stores the addresses $B_1$ to $B_m$ included in the plurality of second read commands received in the second sequence in the memory 6. The plurality of the addresses $B_1$ to $B_m$ are stored as password reception addresses in the memory 6. Moreover, a predetermined password PW is stored in the memory 6.

The conversion processing unit 43 converts into a first password the addresses $B_1$ to $B_m$ included in the plurality of the second commands stored in the memory 6. The lock control unit 44 restricts an access to the memory 6 after the memory is started up. In other words, the lock control unit 44 restricts execution of the read command from the host device 1, after the memory is started up. The lock control unit 44 verifies the first password converted by the conversion processing unit 43 against the predetermined second password, and removes the access restriction to the memory 6 if the converted first password is matched with the predetermined second password. In other words, the lock control unit 44 removes the restriction of execution of the read command from the host device 1.

Figure 5:
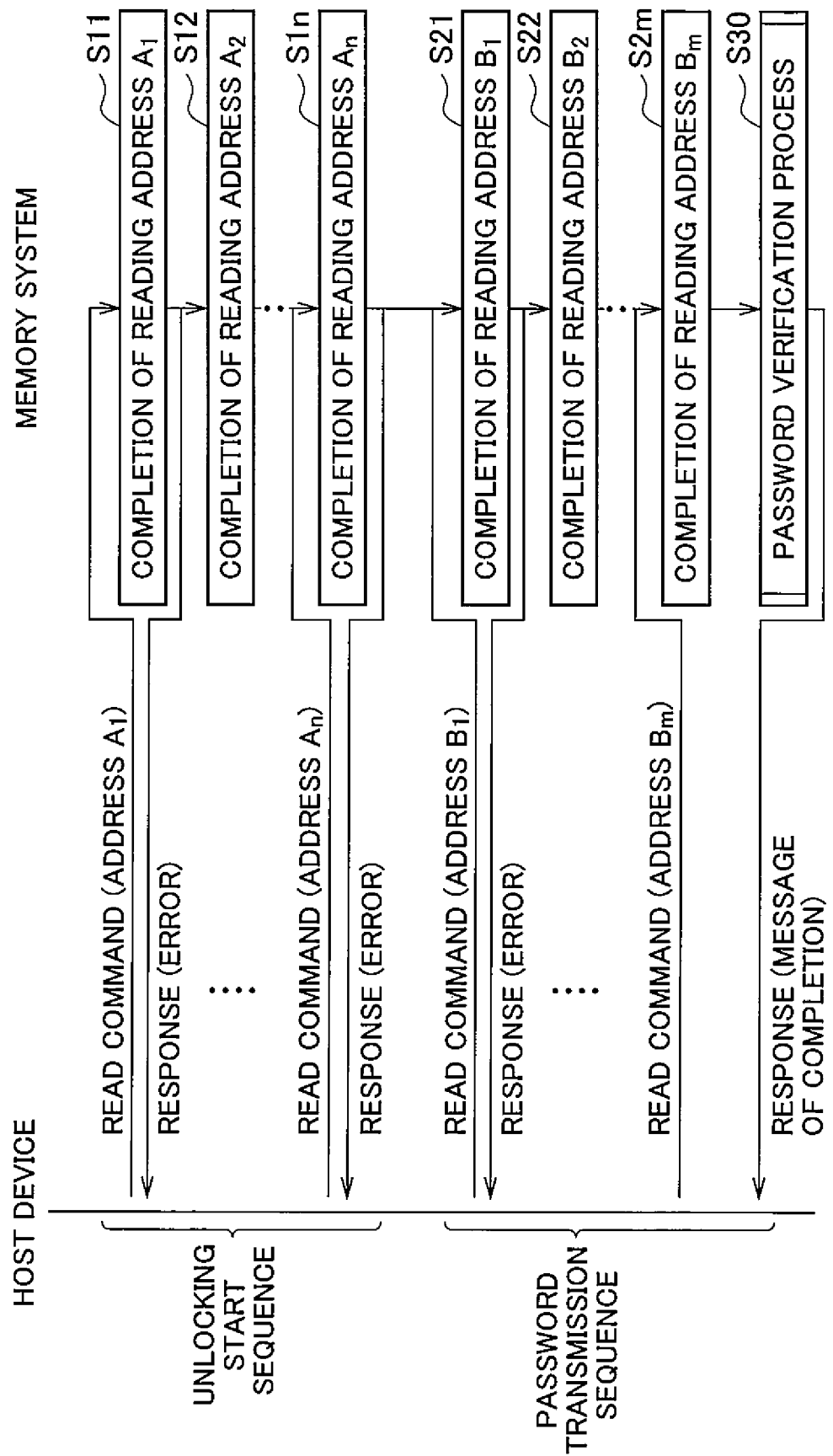
FIG. 5 is a diagram showing an unlocking start sequence and a password transmission sequence of the memory system according to the first embodiment.

Next, the unlocking process of the memory system according to the first embodiment configured in this way will now be explained in details, with reference to FIG. 5. The whole control unit 12 executes an unlocking processing program stored in the ROM 13 and thereby the unlocking process is realized.

Firstly, in the unlocking process, an unlocking start sequence and a password transmission sequence are executed. In the unlocking start sequence, when the host device 1 transmits a read command including the address $A_1$ to the memory system 2, the memory controller 5 of the memory system 2 receives the read command including the address $A_1$.

The command determination unit 41 determines whether or not the received read command and the address $A_1$ respectively correspond to a previously set command and $A_1$ of the beginning of the assumed addresses $A_1$ to $A_n$. Since the address $A_1$ is matched with the assumed address, next $A_2$ is applied as the assumed address. Since it is in the locking state regardless of this determining, an error is returned to the host device 1, as a data reading process from the address $A_1$ in accordance with the received read command.

Furthermore, the command determination unit 41 determines whether or not the received read command and the address $A_2$ respectively correspond the previously set command and the $A_2$ of the assumed addresses $A_1$ to $A_n$. Since the address $A_2$ is matched with the assumed address, next $A_3$ is applied as the assumed address. Since it is in the locking state regardless of this determining, an error is returned to the host device 1, as a data reading process from the address $A_2$ in accordance with the received read command.

Similarly, the command determination unit 41 repeatedly executes such determination processing of whether or not the received read command and the address A respectively correspond to the previously set command and the address read from the assumed addresses $A_3$ to $A_n$ in the correct order. Finally, the command determination unit 41 returns an error to the host device 1 as a data reading process from the address $A_n$ in accordance with the received read command.

Then, the command determination unit 41 determines that the plurality of the first read commands including the addresses $A_1$ to $A_n$ have been received from the host device 1 in the first sequence, since the reading of the addresses $A_1$ to $A_n$ is completed. Thus, the unlocking start sequence is completed when the plurality of the first read commands including the addresses $A_1$ to $A_n$ have been read in the first sequence. When the unlocking start sequence is completed, it is shifted to a state of receiving the password transmission sequence.

Next, in the password transmission sequence, when the host device 1 transmits a read command including the address $B_1$ to the memory system 2, the memory controller 5 of the memory system 2 receives the read command including the address $B_1$.

The command determination unit 41 stores the address $B_1$ included in the received read command in the memory 6. The command determination unit 41 returns an error to the host device 1, as a data reading process from the address $B_1$ in accordance with the received read command.

Furthermore, the command determination unit 41 stores the address $B_2$ included in the subsequent received read command in the memory 6. The command determination unit 41 returns an error to the host device 1, as a data reading process from the address $B_2$ in accordance with the received read command.

Similarly, the command determination unit 41 repeatedly executes such a process of storing the address included in the received read command in the memory 6, and then the reading process of the address $B_m$ is finally completed (Step S2m). Although an error may be replied in a similar manner until then in the final process, if the password is correct as a result of the subsequent password verification processes, a message indicting of unlocking may be replied.

Figure 6:
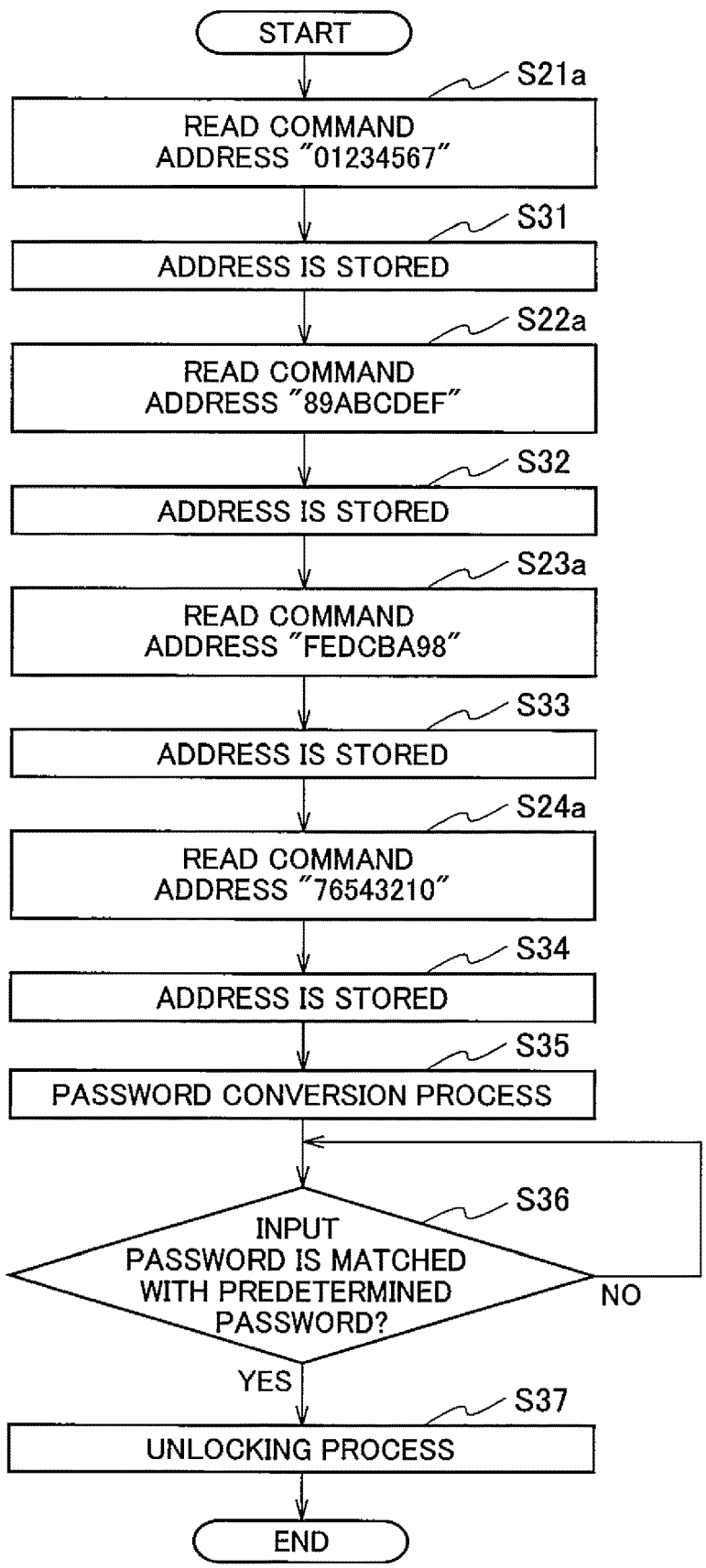
FIG. 6 is a flow chart showing a conversion process from an additional address to a password of the memory system according to the first embodiment.

Next, a password verification process is executed (Step S30). This password verification process will now be explained in details, with reference to FIG. 6. The read command addresses in FIG. 6 is an example of the addresses $B_1$ to $B_m$ shown in FIG. 5.

Firstly, a read command address "01234567" is read by the whole control unit 12 (Step S21a), and the aforementioned address is stored in the memory 6 (Step S31). Next, a read command address "89ABCDEF" is read by the whole control unit 12 (Step S22a), and the aforementioned address is stored in the memory 6 (Step S32).

Next, the read command address "FEDCBA98" is read by the whole control unit 12 (Step S23a), and the aforementioned address is stored in the memory 6 (Step S33). Next, the read command address "76543210" is read by the whole control unit (Step S24a), and the aforementioned address is stored in the memory 6 (Step S34).

Next, a password conversion process is executed by the conversion processing unit 43 (Step S35). The conversion processing unit 43 converts the address "01234567", the address "89ABCDEF", the address "FEDCBA98", and the address "76543210" into a password (Step S35).

In other words, data in which the address 01234567, the address 89ABCDEF, the address FEDCBA98, and the address 76543210 are coupled is applied as a password. Here, each address is 32-bit address and the password is 128-bit data, for example.

Next, the lock control unit 44 determines whether or not the password converted by the conversion processing unit 43 is matched with a predetermined password (Step S36). The predetermined password is a password which is previously produced.

The lock control unit 44 removes the lock, when the password converted by the conversion processing unit 43 is matched with the predetermined password (Step S37). Accordingly, the memory can be unlocked merely by using the command used also for other purposes, without using a special command as the unlock command.

(Password Change Sequence)

Figure 7:
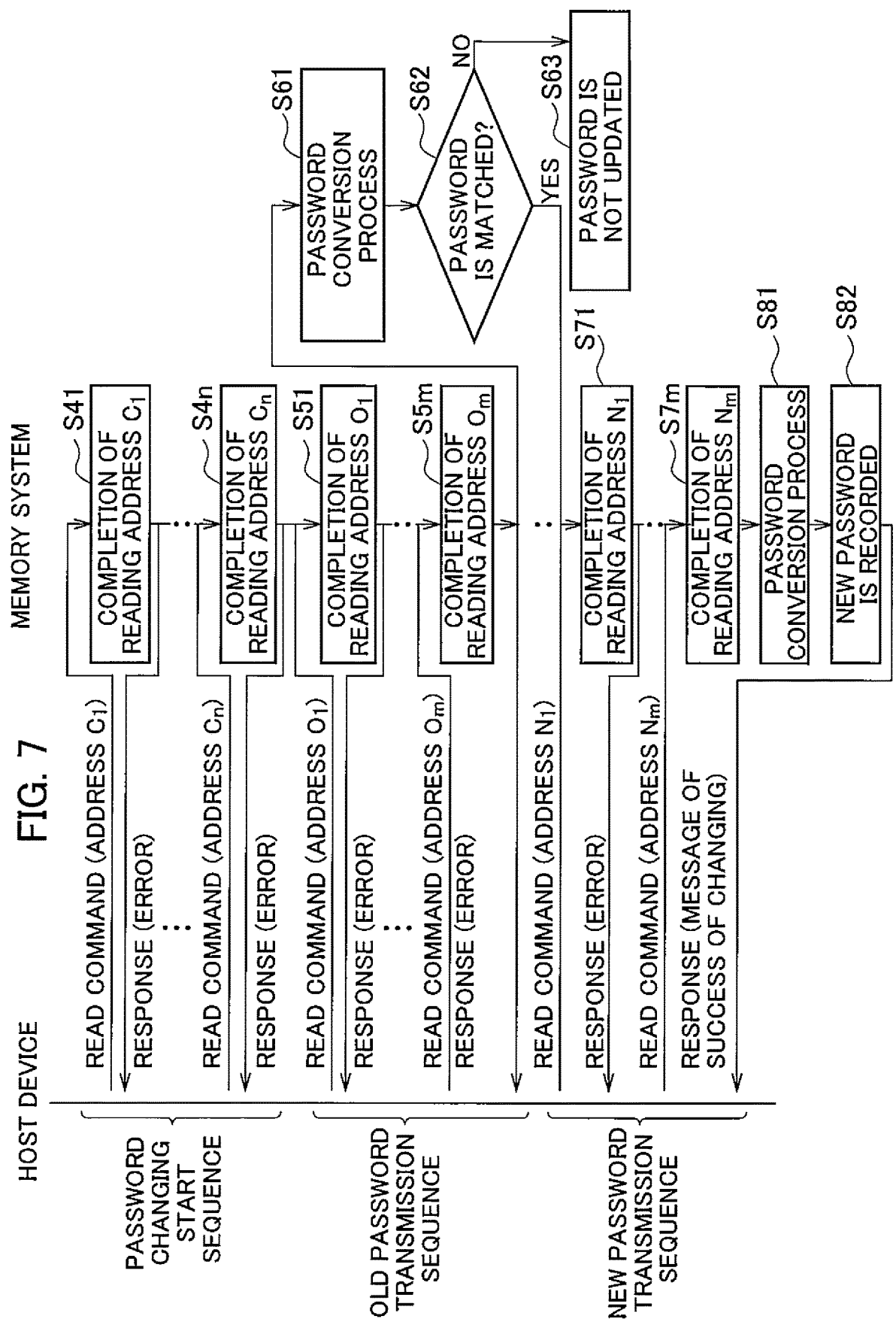
FIG. 7 is a diagram showing a password change sequence of the memory system according to the first embodiment.

Next, the password change sequence of the memory system according to the first embodiment will now be explained, with reference to FIG. 7.

Firstly, in order to change a password, a password changing start sequence, an old password transmission sequence, and a new password transmission sequence are executed. In the password changing start sequence, when the host device 1 transmits a read command including the address $C_1$ to the memory system 2, the memory controller 5 of the memory system 2 receives the read command including the address $C_1$.

The command determination unit 41 determines whether or not the received read command and the address $C_1$ respectively correspond to a previously set command and $C_1$ of the beginning of the assumed addresses $C_1$ to $C_n$ (where n is a natural number). Since the address $C_1$ is matched with the assumed address, next $C_2$ is applied as the assumed address. Since it is in the locking state regardless of this determining, an error is returned to the host device 1 as a reading process of the address $C_1$.

Similarly, the command determination unit 41 repeatedly executes such determination processing of whether or not the received read command and the address A respectively correspond to the previously set command and the address read from the assumed addresses $C_1$ to $C_n$ in the correct order. The reading process of the address $C_n$ is finally completed (Step S4n).

Next, in the old password transmission sequence, when the host device 1 transmits a read command including the address $O_1$ to the memory system 2, the memory controller 5 of the memory system 2 receives the read command including the address $O_1$.

The command determination unit 41 stores the address $O_1$ included in the received read command in the memory 6. An error is returned to the host device 1, as a reading process of the address $O_1$.

Similarly, the command determination unit 41 stores the address $B_2$ included in the subsequent received read command in the memory 6. An error is returned to the host device 1, as a reading process of a final address $O_m$. The addresses $O_1$ to $O_m$ (where m is a natural number) are stored in the memory 6 through the above-mentioned processes at the time of reading the addresses.

Next, the password conversion process is executed by the conversion processing unit 43 (Step S61). The conversion processing unit 43 converts the addresses $O_1$ to $O_m$ into a password.

Next, the lock control unit 44 determines whether or not the password converted by the conversion processing unit 43 is matched with a predetermined password (Step S62). The lock control unit 44 does not update the password, when the password converted by the conversion processing unit 43 is not matched with the predetermined password (Step S63).

The lock control unit 44 executes the new password transmission sequence when the password converted by the conversion processing unit 43 is matched with the predetermined password. In the new password transmission sequence, when the host device 1 transmits a read command including the address $N_1$ to the memory system 2, the memory controller 5 of the memory system 2 receives the read command including the address $N_1$.

The command determination unit 41 determines whether or not the received read command and the address $N_1$ respectively correspond to a previously set command and $N_1$ of the beginning of the assumed addresses $N_1$ to $N_m$. Since the address $N_1$ is matched with the assumed address, next $N_2$ is applied as the assumed address. Since it is in the locking state regardless of this determining, an error is returned to the host device 1 as a reading process of the address $N_1$.

Similarly, the command determination unit 41 repeatedly executes such determination processing of whether or not the received read command and the address A respectively correspond to the previously set command and the address read from the assumed addresses $N_1$ to $N_m$ in the correct order. The reading process of the address $N_m$ is finally completed (Step S7m). In addition, the addresses $N_1$ to $N_m$ are stored in the memory 6 at the time of reading the addresses.

Next, the password conversion process is executed by the conversion processing unit 43 (Step S81). The conversion processing unit 43 converts the addresses $N_1$ to $N_m$ (where m is a natural number) into a new password. Then, the new password is stored in the memory 6 (Step S82). Furthermore, the memory system 2 returns a message of success of changing password to the host device 1.

Note that the password cannot be changed/set in the locking state, but can be changed/set only in the state of the memory is unlocked. At the time of product shipment, a predetermined password is set in advance.

Although there has been described the case where the lock control unit 44 controls so that the data cannot be read and written from/to every address in the locking state in the memory system according to the first embodiment, when the reading/writing is allowed for some addresses, only reading may be allowed, only writing may be allowed, or a combination thereof may be in the locking state.

Moreover, when a plurality of the second commands including the addresses $B_1$ to $B_m$ are received in the second sequence after receiving a plurality of the first commands including the addresses $A_1$ to $A_n$ in the first sequence, the lock control unit 44 may remove the restriction of execution of the command or may restrict the execution of the command from the host device 1 by the memory controller 5 if the addresses $B_1$ to $B_m$ included in the plurality of the second commands are matched with the previously stored addresses.

Moreover, there may be the following six cases in accordance with passwords as examples of capable of locking, unlocking, etc., and each combination thereof may be realized.

In a first example, after the memory system 2 is started up, the lock control unit 44 prohibits reading in some or all area as a locking state, and then the lock is removed to allow the reading when the password converted by the conversion processing unit 43 is matched with the predetermined password.

In a second example, after the memory system 2 is started up, the lock control unit 44 prohibits writing in some or all area as a locking state, and then the lock is removed to allow the writing when the password converted by the conversion processing unit 43 is matched with the predetermined password.

In a third example, after the memory system 2 is started up, the lock control unit 44 allows reading in all areas, and then it is shifted to the locking state when the password converted by the conversion processing unit 43 is matched with the predetermined password, thereby prohibiting reading in some or all area.

In a fourth example, after the memory system 2 is started up, the lock control unit 44 allows writing in all areas, and then it is shifted to the locking state when the password converted by the conversion processing unit 43 is matched with the predetermined password, thereby prohibiting writing in some or all area.

In a fifth example, the memory system 2 can read information on usage of the memory (rewriting frequency of memory, total writing quantity, and the like) when the password converted by the conversion processing unit 43 is matched with the predetermined password.

In a sixth example, the memory system 2 executes functions of inside, such as switching of firmware (FW), when the password converted by the conversion processing unit 43 is matched with the predetermined password.

Thus, according to the memory system according to the first embodiment, the command determination unit 41 determines whether or not a plurality of the first commands including the addresses $A_1$ to $A_n$ have been received from the host device 1 in the first sequence.

After determining that a plurality of the first commands are received from the host device 1 in the first sequence, the memory access unit 42 accesses the memory 6 to store the addresses $B_1$ to $B_m$ in the memory 6 when the plurality of the second commands including the addresses $B_1$ to $B_m$ are received in the second sequence.

The conversion processing unit 43 converts into the first password the plurality of the second addresses $B_1$ to $B_m$ stored in the memory 6.

The lock control unit 44 changes into the locking state after being started up, and verifies the first password converted by the conversion processing unit 43 against the predetermined second password, and removes the access restriction if the converted first password is matched with the predetermined second password.

Accordingly, the memory can be unlocked, without using a dedicated command such as an unlock command.

Note that the conversion process of the conversion processing unit 43 is not limited to the example mentioned above, the addresses can also be converted into the password by means of the function of the following equation (1), for example:

$$\text{Password}=AES(k,A\|B\|C\|D) \text{xor } A\|B\|C\|D \quad (1)$$

where AES (k, d) is Advanced Encryption Standard (AES) encryption, k is a key, and d is plaintext data. A, B, C, and D are respectively addresses. xor denotes exclusive OR and means the exclusive OR between AES(k, A∥B∥C∥D) and A∥B∥C∥D.

Modified Example of First Embodiment

Figure 8:
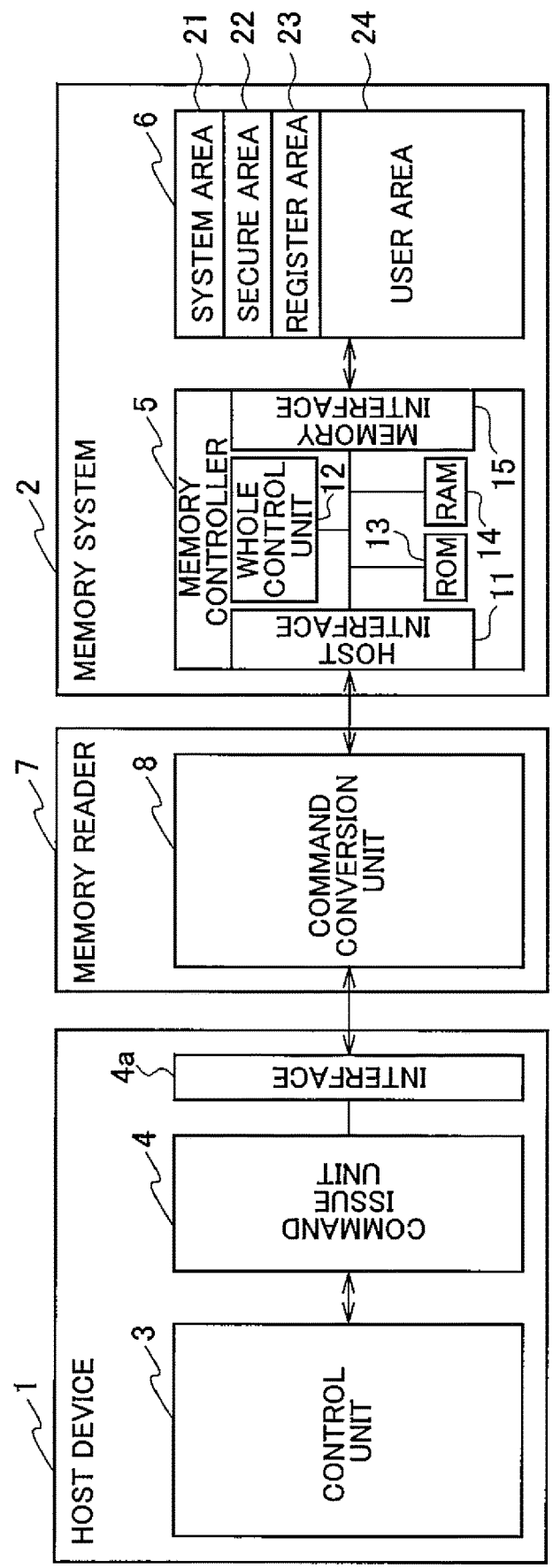
FIG. 8 is a block diagram showing a configuration of a memory system according to a modified example of the first embodiment and a host device.

FIG. 8 is a configuration block diagram showing a memory system 2 and a host device 1, in a memory system according to the modified example of the first embodiment. In the memory system according to the modified example of the first embodiment, a memory reader 7 is provided between the host device 1 and the memory system 2.

The memory reader 7 is used when the host device 1 and the memory system 2 use protocols different from each other. The memory reader 7 includes a command conversion unit 8. The command conversion unit 8 converts a read command and a write command according to a first protocol received from the host device 1 into a read command and a write command according to the second protocol, and issues the converted read command and write command to the memory system 2.

The command conversion unit 8 receives a result with respects to the read command and the write command from the memory system 2, and converts the result of the second protocol into the result of the first protocol to be returned to the host device 1.

According to the memory system according to the modified example of the first embodiment, the command determination unit 41 determines whether or not a plurality of the first read commands including the addresses have been received from the host device 1 in the first sequence.

After the command determination unit 41 determines that the plurality of first read commands including the addresses have been received from the host device 1 in the first sequence, the memory access unit 42 accesses the memory 6 when a plurality of second read commands including addresses are received in the second sequence, and stores the addresses included in the plurality of second read commands received in the second sequence in the memory 6.

The conversion processing unit 43 converts into a first password the addresses included in the plurality of the second read commands stored in the memory 6.

The lock control unit 44 changes into the locking state after being started up, and verifies the first password converted by the conversion processing unit 43 against the predetermined second password, and removes the access restriction if the converted first password is matched with the predetermined second password.

Accordingly, the memory can be unlocked, without using a dedicated command such as an unlock command.

Second Embodiment

Figure 9:
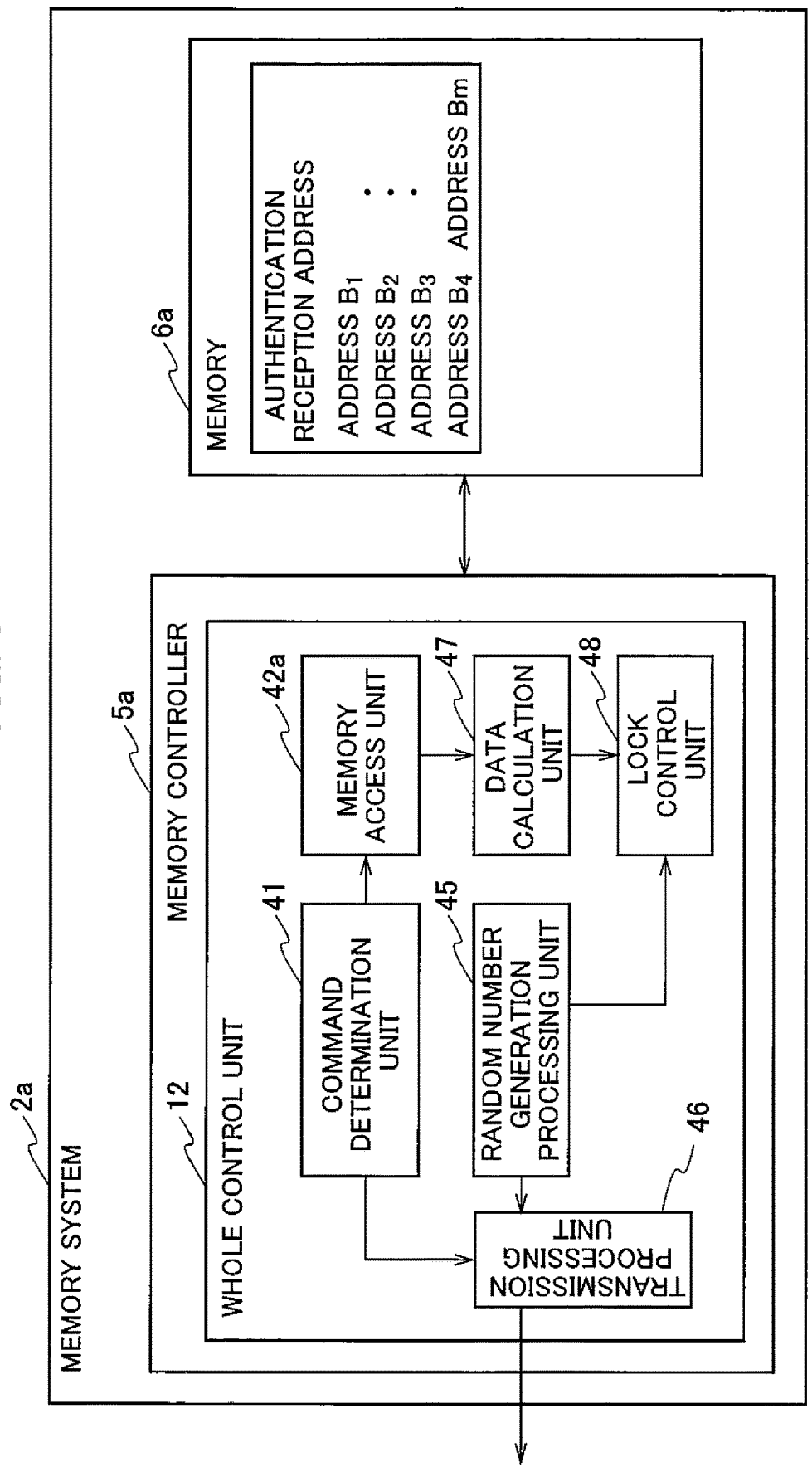
FIG. 9 is a block diagram showing a configuration of the memory system according to a second embodiment.

FIG. 9 is a block diagram showing a configuration of a memory system 2a according to a second embodiment. The memory system 2a includes a memory controller 5a and a memory 6a. The memory controller 5a includes a command determination unit 41, a memory access unit 42a, a random number generation processing unit 45, a transmission processing unit 46, a data calculation unit 47, and a lock control unit 48. The whole control unit 12 executes a command cancel processing program stored in the ROM 13, and thereby functions of the command determination unit 41, the memory access unit 42a, the random number generation processing unit 45, the transmission processing unit 46, the data calculation unit 47, and the lock control unit 48.

The command determination unit 41 determines whether or not a plurality of first read commands including addresses have been received from the host device 1 in a first sequence.

When the command determination unit 41 determines that the final command in the first sequence has been received, the random number generation processing unit 45 generates random number information, and calculates the first data by a predetermined first calculation on the basis of the generated random number information. The random number generation processing unit 45 generates the random number information by performing calculation based on random number seed data updated in each time of generation of the random number and information which is different each time of calling a ring modulator, etc.

The transmission processing unit 46 transmits the random number information generated by the random number generation processing unit 45 to the host device 1.

The host device 1 generates data by a predetermined first calculation on the basis of the random number information sent from the transmission processing unit 46, and calculates a plurality of second addresses from the generated data. The host device 1 transmits a read command with respect to the plurality of second addresses which are calculated to the system memory 2 in order.

After the random number information is transmitted, when the plurality of second read commands including the addresses are received in the second sequence, the data calculation unit 47 calculates second data by a predetermined second calculation on the basis of the addresses included in the plurality of second read commands.

The lock control unit 48 removes the lock, when the second data calculated by the data calculation unit 47 is matched with the first data generated by the random number generation processing unit 45. In other words, the lock control unit 48 removes the restriction of execution of the read command from the host device 1.

Figure 10:
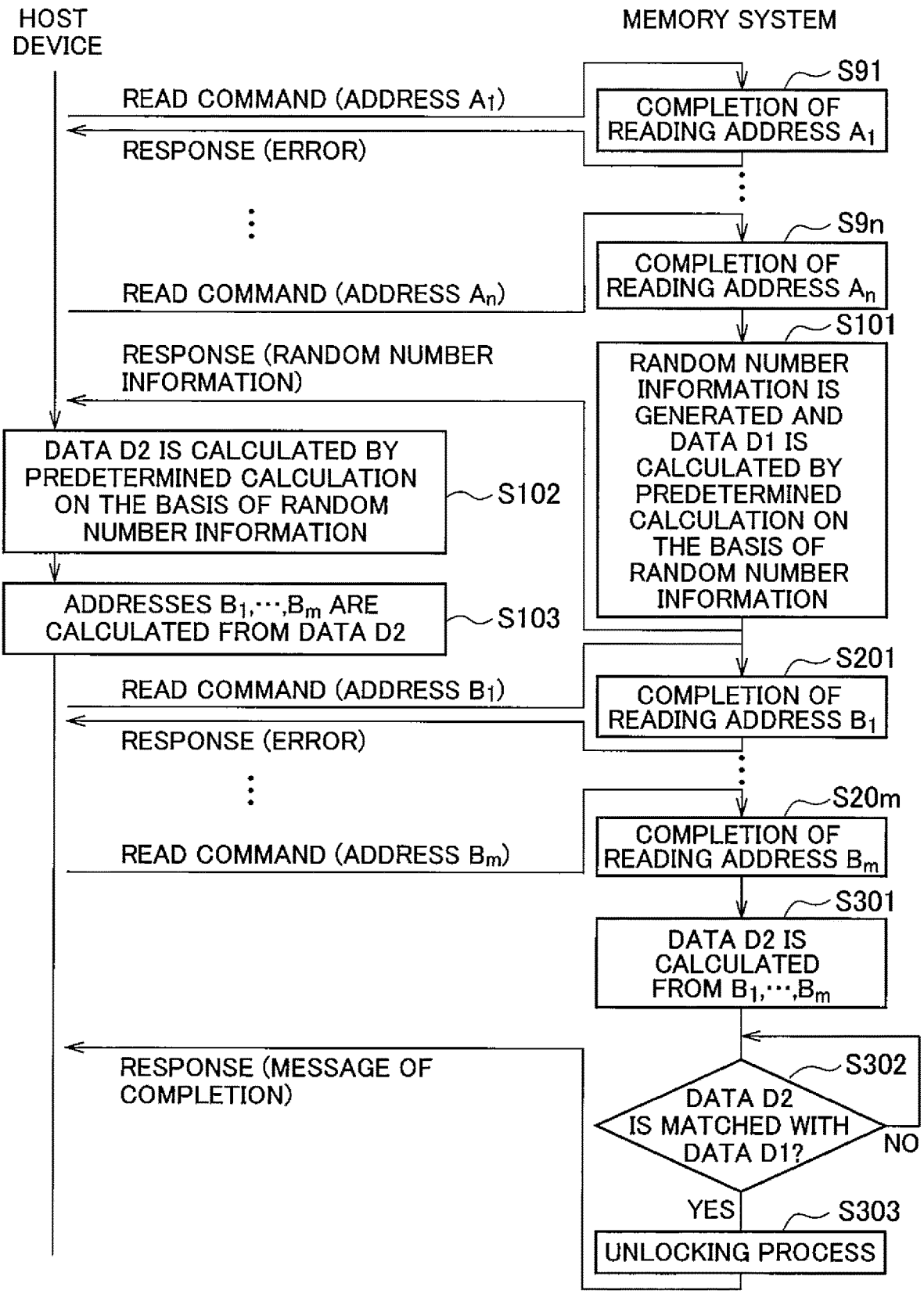
FIG. 10 is a diagram showing a sequence when a read command is transmitted from the host device to the memory system according to the second embodiment.

Next, the unlocking process of the memory system according to the second embodiment configured in this way will now be explained in details, with reference to FIG. 10. The whole control unit 12 executes a command cancel processing program stored in the ROM 13 and thereby the unlocking process is realized.

Firstly, when the host device 1 transmits a read command including the address $A_1$ to the memory system 2, the memory controller 5a of the memory system 2 receives the read command including the address $A_1$.

The command determination unit 41 determines whether or not the received read command and the address $A_1$ respectively correspond to a previously set command and $A_1$ of the beginning of the assumed addresses $A_1$ to $A_n$. Since the address $A_1$ is matched with the assumed address, next $A_2$ is applied as the assumed address. Since it is in the locking state regardless of this determining, an error is returned to the host device 1 as a reading process of the address $A_1$.

Similarly, the command determination unit 41 repeatedly executes such determination processing of whether or not the received read command and the address A respectively correspond to the previously set command and the address read from the assumed addresses $A_1$ to $A_n$ in the correct order. The reading process of the address $A_n$ is finally completed (Step S9n).

Then, the command determination unit 41 determines that the plurality of the first read commands including the addresses $A_1$ to $A_n$ have been received from the host device 1 in the first sequence, since the reading of the addresses $A_1$ to $A_n$ is completed.

Next, the random number generation processing unit 45 generates random number information, and calculates data D1 by a predetermined first calculation on the basis of the generated random number information (Step S101). Specifically, the data D1 is calculated as the predetermined first calculation using the function of the following equations (2):

$$\text{Data } D1 = \text{AES}(k, \text{random number}) \text{ xor random number} \quad (2)$$

where xor denotes exclusive OR and means the exclusive OR between AES(k, random number) and random number. The data D1 is "0123456789ABCDEFFEDCBA9876543210", for example.

Furthermore, the transmission processing unit 46 transmits the random number information generated by the random number generation processing unit 45 to the host device 1, as data with respect to the final command including the address $A_n$.

The host device 1 receives the random number information from the transmission processing unit 46, and generates data D2 using the above-mentioned predetermined first calculation, i.e., the equation (2), (Step S102). Furthermore, the host device 1 calculates a plurality of second addresses $B_1$, $B_m$ (where m is a natural number) from the generated data D2 (Step S103).

An example of a method of calculating the address from the data D2 will now be explained. If the plurality of the addresses correspond to four addresses $B_1$, ..., $B_4$ and the data D2 is 128-bit data, 128-bit data is divided four 32-bit data which are respectively addresses.

If the data D2 is "0123456789ABCDEFFEDCBA9876543210", it is divided into $B_1$=01234567, $B_2$=89ABCDEF, $B_3$=FEDCBA98, and $B_4$=76543210.

Next, when the host device 1 transmits a read command including the address $B_1$ to the memory system 2, the memory controller 5a of the memory system 2 receives the read command including the address $B_1$.

The command determination unit 41 determines whether or not the received read command and the address $B_1$ respectively correspond to a previously set command and $B_1$ of the beginning of the assumed addresses $B_1$ to $B_m$. Since the address $B_1$ is matched with the assumed address, next $B_2$ is applied as the assumed address. Since it is in the locking state regardless of this determining, an error is returned to the host device 1 as a reading process of the address $B_1$ (Step S201).

Similarly, the command determination unit 41 repeatedly executes such determination processing of whether or not the received read command and the address A respectively correspond to the previously set command and the address read from the assumed addresses $B_1$ to $B_m$ in the correct order. The reading process of the address $B_m$ is finally completed (Step S20m). In addition, the addresses $B_1$ to $B_m$ are stored in the memory 6a at the time of reading the addresses.

Next, the data calculation unit 47 calculates the data D2 on the basis of the addresses $B_1$ to $B_m$ read by the memory access unit 42a from the memory 6a (Step S301). In the example mentioned above, the plurality of the addresses are four addresses $B_1$ to $B_4$, i.e., $B_1$=01234567, $B_2$=89ABCDEF, $B_3$=FEDCBA98, and $B_4$=76543210. In this case, the four addresses $B_1$ to $B_4$ are coupled to one another, and thereby the data D2 composed of "0123456789ABCDEFFEDCBA9876543210" is obtained.

The lock control unit 48 determines whether or not the second data D2 calculated by the data calculation unit 47 is matched with the first data D1 generated by the random number generation processing unit 45 (Step S302).

The lock control unit 48 removes the lock, when the second data D2 calculated by the data calculation unit 47 is matched with the first data D1 generated by the random number generation processing unit 45 (Step S303). In the above-mentioned example, the data D1 and the data D2 are data composed of "0123456789ABCDEFFEDCBA9876543210", and therefore the both are matched with each other.

Thus, according to the memory system according to the second embodiment, the random number generation processing unit 45 generates the first data using the random number information, and the data calculation unit 47 calculates the second data using the plurality of the second addresses on the basis of the random number information. The lock control unit 48 removes the lock, when the second data is matched with the first data.

Accordingly, the memory can be unlocked, without using a dedicated command such as an unlock command.

Moreover, since the random number information is used for the authentication process, the memory can be unlocked in an address different each time. Moreover there is an effect that the memory cannot be unlocked other than a specific host device having the same function.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a memory; and
a memory controller which controls the memory, wherein the memory controller is configured to:
determine whether or not a plurality of first commands including addresses have been received from a host device in a first sequence;
after determining that the plurality of the first commands have been received in the first sequence, when a plurality of second commands including addresses are received from the host device in a second sequence, store the addresses included in the plurality of the second commands in the memory;
convert into a first password the addresses included in the plurality of the second commands stored in the memory; and
perform one of:
not restrict execution of the first commands and the second commands from the host device by the memory controller after the memory system is started up, and restrict the execution of the first commands and the second commands from the host device by the memory controller after the first password is matched with a predetermined second password;
restrict execution of the first commands and the second commands from the host device by the memory controller after the memory system is started up, and remove the restriction of the execution of the first commands and the second commands from the host device by the memory controller after the first password is matched with a predetermined second password.

2. The memory system according to claim 1, wherein the memory controller restricts transmission of data read from the memory to the host device, and removes the transmission restriction of the data read from the memory to the host device when the first password is matched with the predetermined second password.

3. The memory system according to claim 1, wherein the memory controller restricts writing to the memory of data input from the host device, and removes the writing restriction to the memory of the data input from the host device when the first password is matched with the predetermined second password.

4. The memory system according to claim 1, wherein the memory controller allows transmission of data read from the memory to the host device, and restricts the transmission restriction of the data read from the memory to the host device when the first password is matched with the predetermined second password.

5. The memory system according to claim 1, wherein the memory controller allows writing to the memory of data input from the host device, and restricts the writing restriction to the memory of the data input from the host device when the first password is matched with the predetermined second password.

6. A memory system comprising:
a memory; and
a memory controller which controls the memory, wherein the memory controller is configured to:
determine whether or not a plurality of first commands including addresses have been received from a host device in a first sequence;
after determining that the final command has been received in the first sequence, generate random number information, calculate first data by a predetermined first calculation on the basis of the generated random number information, and transmit the random number information to the host device;
after the random number information is transmitted, when a plurality of second commands including addresses from the host device are received in a second sequence, calculate second data by a second predetermined calculation on the basis of the addresses included in the plurality of the second commands; and
remove a restriction on execution of the first commands and the second commands from the host device by the memory controller after the second data is matched with the first data.

7. The memory system according to claim 6, wherein the addresses included in the plurality of the second commands are composed of addresses calculated from data generated by the predetermined first calculation on the basis of the random number information in the host device.

8. A memory control method to control a memory system, the memory system comprising a memory and a memory controller, the memory control method comprising:
starting up the memory system;

determining whether or not a plurality of first commands including addresses have been received from a host device in a first sequence;

after determining that the plurality of the first commands have been received in the first sequence, when a plurality of second commands including addresses are received from the host device in a second sequence, storing the addresses included in the plurality of the second commands in the memory;

converting into a first password the addresses included in the plurality of the second commands stored in the memory;

determining that the first password matches a predetermined second password; and perform one of:

restricting execution of the first commands and the second commands from the host device after the memory system is started up, and removing the restriction of the execution of the first commands and the second commands from the host device in response to the first password matching with the predetermined second password;

removing the restricting execution of the first commands and the second commands from the host device after the memory system is started up, and restricting the execution of the first commands and the second commands from the host device in response to the first password matching with the predetermined second password.

9. The memory control method according to claim 8 further comprising restricting transmission of data read from the memory to the host device, and removing the transmission restriction of the data read from the memory to the host device when the first password is matched with the predetermined second password.

10. The memory control method according to claim 8 further comprising restricting writing to the memory of data input from the host device, and removing the writing restriction to the memory of the data input from the host device when the first password is matched with the predetermined second password.

11. The memory control method according to claim 8 further comprising allowing transmission of data read from the memory to the host device, and restricting the transmission restriction of the data read from the memory to the host device when the first password is matched with the predetermined second password.

12. The memory control method according to claim 8 further comprising allowing writing to the memory of data input from the host device, and restricting the writing restriction to the memory of the data input from the host device when the first password is matched with the predetermined second password.

\* \* \* \* \*